UNITED STATES PATENT OFFICE.

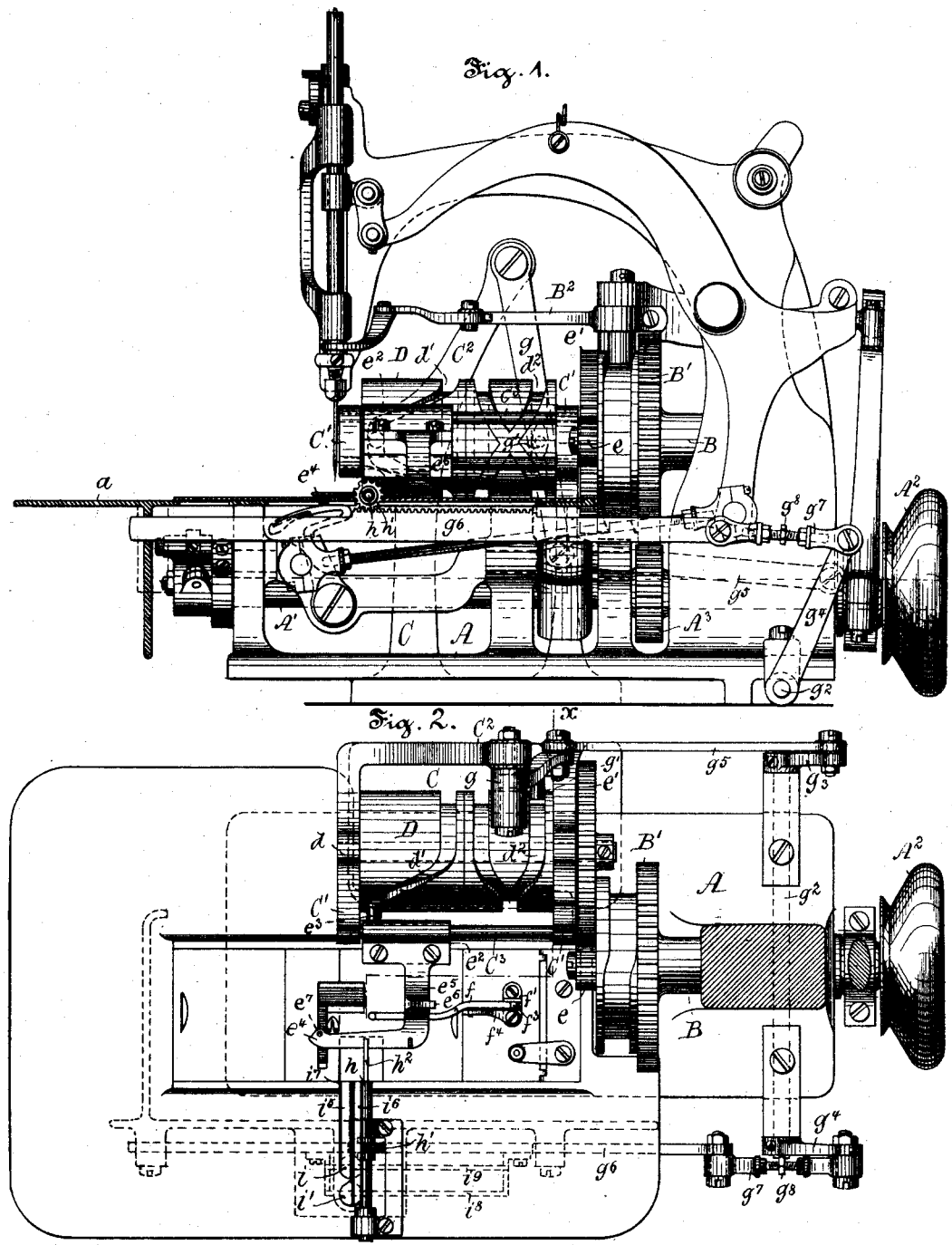

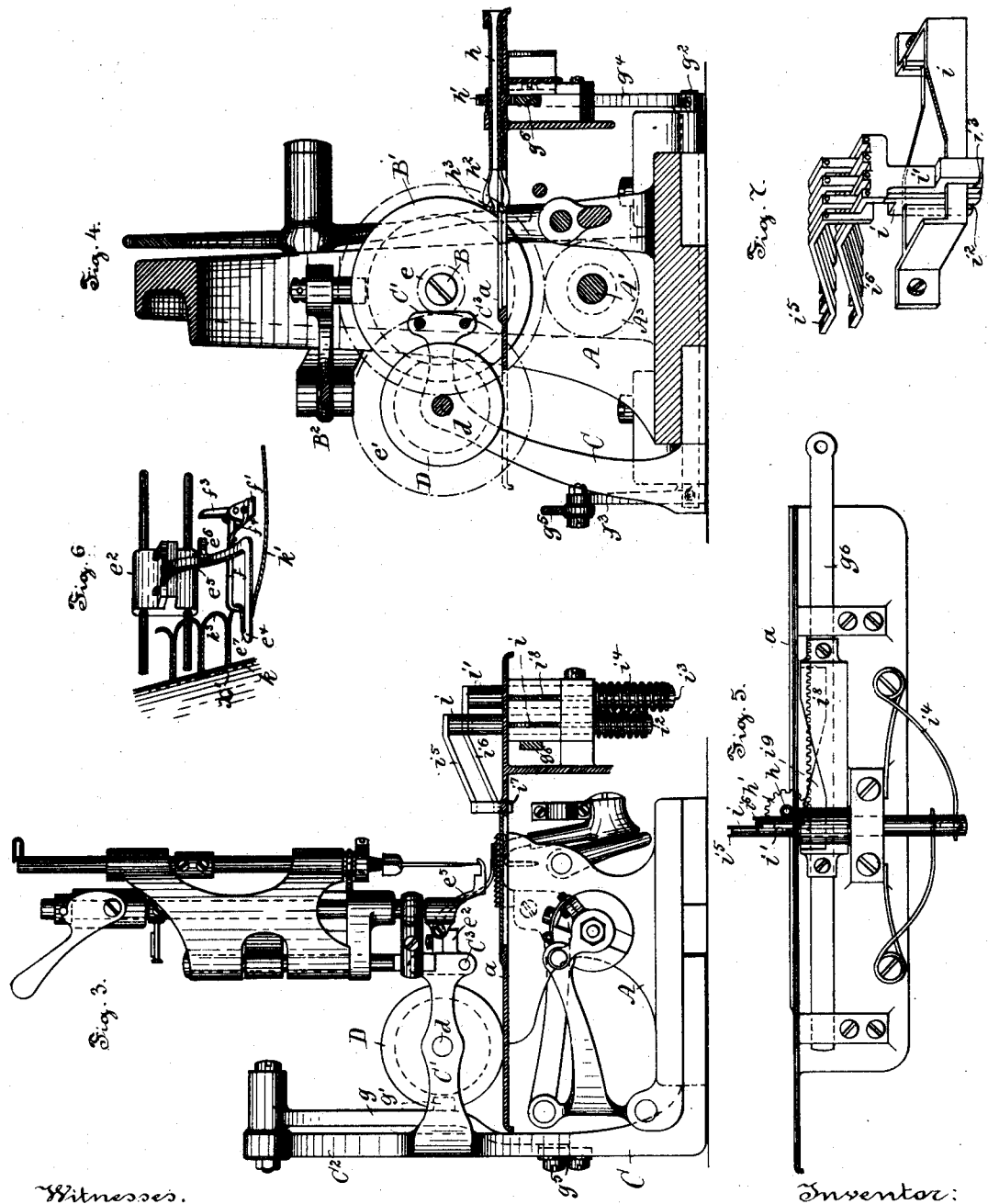

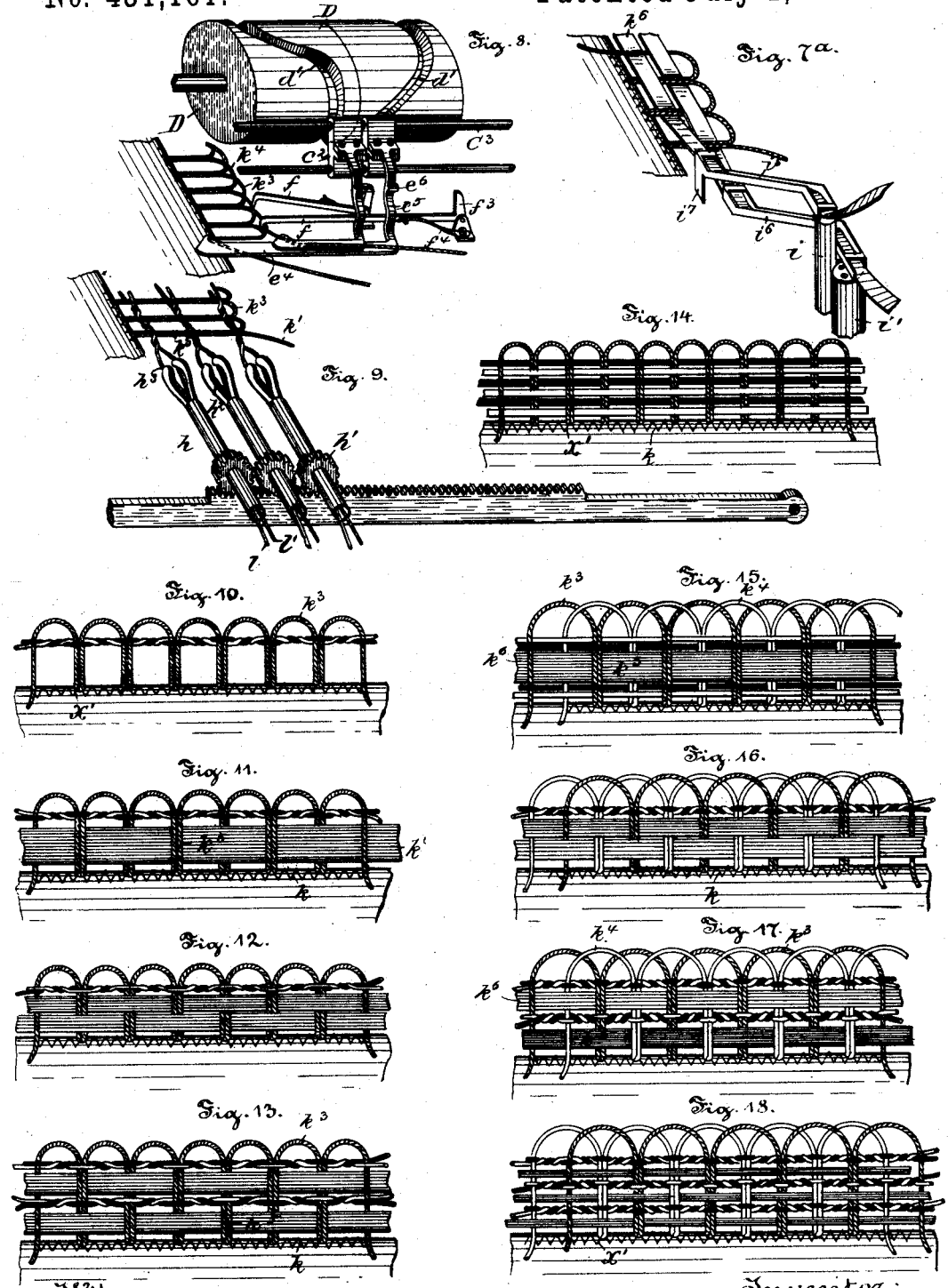

DAVID C. BELLIS, OF PHILADELPHIA, PENNSYLVANIA.

MACHINE FOR MAKING TRIMMINGS FOR THE EDGES OF FABRICS.

SPECIFICATION forming part of Letters Patent No. 431,161, dated July 1, 1890.

Application filed February 3, 1890. Serial No. 339,031. (No model.)

*To all whom it may concern:*

Be it known that I, DAVID C. BELLIS, a citizen of the United States, and residing at the city of Philadelphia, in the county of Philadelphia and State of Pennsylvania, have invented certain new and useful Improvements in Machines for Making Trimmings for the Edges of Fabrics, of which the following is a specification.

The object of my invention is to provide a machine with compact and efficient mechanism or with attachments applied thereto, whereby it is rendered available for making trimmings or borders for the edges of fabrics in which a row of stitches is formed on the fabric close to or over the edge thereof and with a continuous cord or tape confined or secured by certain of said stitches and looped beyond the edge of the fabric, so as to form parallel contiguous bars or pillars extending from the row of stitches and with one or more cords twisted alternately in opposite directions around said bars or pillars and across the loops thereof, or with one or more tapes, cords, or ribbons disposed over and under the respective bars or pillars, or with one or more cords twisted alternately in opposite directions around said bars or pillars and across said loops, and with ribbons, cords, or tapes alternately disposed over and under said bars or pillars between or adjacent to the cords twisted together around said bars or pillars and extending across said loops.

My invention consists of the construction, arrangement, and combination of parts or attachments in a machine and of mechanism for actuating the same for making such trimmings for the edges of fabrics.

The nature and characteristic features of my invention will be more fully understood from the following description, taken in connection with the accompanying drawings, forming part hereof, and in which—

Figure 1 is an elevation of a sewing-machine provided with attachments embodying the particular features of my invention. Fig. 2 is a top or plan view thereof with the needle-bar and upper portions of the machine removed, and also showing the cam-cylinder and the mechanism for actuating the principal parts of or attachment to the machine of my invention. Fig. 3 is an end elevation thereof, showing the cloth-table in section and with the rear portion of the machine removed, and showing also the braiding mechanism of the machine. Fig. 4 is a vertical transverse section of the rear portion of machine, taken on the lines *x x* of Fig. 2, and with the twisting mechanism shown in application thereto. Fig. 5 is an elevation of the cloth-table, showing a portion of the twisting and braiding mechanism applied thereto and a modified construction of the mechanism for actuating the ribbon or tape guides. Fig. 6 is a perspective view of a portion of the looping attachment and showing the finger or bodkin and the spring-actuated latch for looping the cords. Fig. 7 is a perspective view of a portion of the braiding attachment, showing two sets of cord or tape guides for braiding more than two tapes, and also showing a portion of the mechanism for actuating the same. Fig. 7$^a$ is a perspective view showing the relative positions of the ribbon or tape guides with reference to the loops and to the edge of the fabric during the operation of the machine. Fig. 8 is a perspective view of an attachment and its actuating mechanism for forming two rows of superposed loops and showing the relative positions of the two fingers or bodkins and of the two spring-latches and the cam-cylinder for actuating the same. Fig. 9 is a perspective view of the mechanism for twisting three rows, each consisting of two cords together alternately in opposite directions around the bars or pillars, and also showing the relative position of the details or parts with reference to the edge of the fabric. Fig. 10 is a diagram illustrating the particular features of a border or edging made in accordance with my invention and having a row of stitches formed on the fabric over the edge thereof and a continuous cord confined by certain of said stitches and looped beyond the latter so as to form parallel continuous bars or pillars extending outward from the row of stitches and two cords twisted together alternately in opposite directions around and between said bars or pillars. Fig. 11 is a diagram of a similar border, having in addition to the row of twisted cords a braid or ribbon laid parallel with and contiguous to the edge of the fabric and lying alternately under and over the bars or pillars. Fig. 12 is a diagram of a similar border having two braids, tapes, or ribbons disposed over and under the pillars or bars of the trimming and in proximity to the row of twisted cords surrounding said bars or pillars and extending across the loops formed by said bars or pillars. Fig. 13 is a diagram of a similar border having rows of braid or ribbon disposed alternately between the rows of twisted cord. Fig. 14 is a diagram of a similar border with the twisted cords omitted, and in which six parallel rows of braid, cord, or ribbon are woven or laid alternately above and below the pillars or bars. Fig. 15 is a diagram of a similar border having two rows of superposed loops and five parallel strips of tape or ribbon of varying width disposed alternately over and under the said loops. Fig. 16 is a diagram of a similar border having two superposed rows of loops and two strips of braid or ribbon and one row of twisted cord arranged over and under said loops. Fig. 17 is a diagram of a similar border having two superposed rows of loops and two parallel rows of braid or ribbon alternated with rows of twisted cord; and Fig. 18 is a diagram of a similar border having two superposed rows of loops and showing three parallel rows of braid alternated with rows of twisted cord.

My invention may be advantageously applied to various types of sewing-machines, but preference is given to those especially adapted for the formation of over-edge stitches for the following reasons: first, because a crochet or over-edge binding is produced upon the cut or raw edge of the fabric; second, because the pillars or bars may be drawn completely out to the edge of the fabric, and third, because the finished border or edging presents substantially the same appearance when viewed from either side of the fabric.

In order to fully illustrate and explain the nature and characteristic features of my invention a brief description thereof in application to a so-called "union special sewing-machine" will be given; but before proceeding with this description the elements of the sewing-machine which operate in conjunction with my invention will be pointed out, reference being had to the accompanying drawings, in which—

A is the frame or housing of the sewing-machine.

$a$ is the cloth plate or table for supporting the fabric.

A' is a centrally-located horizontal shaft supported in suitable bearings formed in the frame A and having a pulley $A^2$ and a spur-wheel or pinion $A^3$ keyed thereto.

B is a stationary horizontal stud or counter-shaft secured to or formed integral with the upper portion of the frame A. The cam-faced spur-wheel B', meshing with the pinion $A^3$, is mounted loosely upon this stud or shaft B.

When the machine is in operation, the shaft A' is rotated by means of a positively-driven belt or band passing over the pulley $A^2$, and the rotation of this shaft not only actuates the feeding and stitch-forming mechanism, but also imparts motion to the cam-faced wheel B'. The rotations of cam-wheel B' actuate the bell-crank levers $B^2$ for causing the needle-bar to oscillate backward and forward, and thereby form an over-edge stitch.

Having briefly pointed out the principal elements of the well-known and familiar sewing-machine, which operate in conjunction with my improved attachments, a description of the various parts of the attachments themselves will now be given.

C, Figs. 1, 2, 3, and 4, is a vertical frame secured to or formed integral with the frame or housing A. This frame C is provided with two similarly-disposed horizontal arms C', as hereinafter more fully described, and with a vertical lug $C^2$. The horizontal arms C' are provided near the center thereof with journals and at or near the extremities thereof with apertures adapted for the reception of two parallel horizontal rods or guides $C^3$. The cam cylinder or drum D, mounted on the spindle $d$, is adapted to revolve in the bearings formed in the arms C' of the bracket C.

$e$ is a spur-wheel or pinion, either formed integral with the cam-wheel B' or made separate in the usual manner and keyed or otherwise secured thereto. $e'$ is a spur-wheel meshing with the pinion $e$ and keyed to the rear extremity of the spindle $d$ for imparting a rotary motion to the cam-cylinder D when the machine is in operation.

The velocity of rotation of the cam-cylinder D with reference to the shaft A' materially affects the character of the work done by the machine, as is hereinafter more fully explained, and the velocity of rotation of the cam-cylinder D with reference to the shaft A' may be readily increased or diminished by substituting larger or smaller wheels for the wheels $e$ and $e'$.

$e^2$, Figs. 1, 2, 3, and 6, is a cross-head adapted to slide at right angles to the edge of the fabric upon the parallel rods or guides $C^3$.

$e^3$ is a roller pivotally mounted upon a stud secured to the cross-head $e^2$ and adapted to travel in the closed cam $d'$ formed upon the surface of the cam-cylinder D toward the forward end thereof.

$e^4$ is a horizontal finger or bodkin located parallel with and near to the upper surface of the cloth plate or table $a$, and secured to the cross-head $e^3$, by means of the downwardly-curved arm $e^5$. The arm $e^5$ is provided with a lug $e^6$ for actuating the spring-latch $f$. The bodkin or finger $e^4$ is provided near the extremity thereof with an eye $e^7$ for the reception of the cord or tape which forms the loops of the finished border or edging.

$f'$ is a bracket secured to the cloth plate or table $a$ and adapted for the reception of the latch $f$. This latch $f$ is provided with a hook-shaped extremity and with a lug $f^3$, adapted to contact with the lug $a^6$.

$f^4$ is a spring secured to the bracket $f'$ and adapted to maintain the latch $f$ in a normally-closed position.

When the cam-cylinder D is revolved the roller $e^3$ traverses the closed cam $d'$ and causes the cross-head $e^2$, and with it the bodkin or finger $e^4$, to reciprocate backward and forward, and the closed cam $d'$ is so proportioned as that the bodkin or finger $e^4$ travels backward until the lug $e^6$, contacting with the lug $f^3$, opens or raises the latch $f$ and maintains it for a short time in an open position, and then the bodkin or finger traveling forward to the left of the needle permits the spring $f^4$ to close or depress the latch $f$.

$g$ is a link pivotally connected at one end thereof to the vertical lug $C^2$ and provided at or near its central portion with a lozenge-shaped traveler $g'$, pivotally secured thereto. This traveler $g'$ is adapted to traverse the closed cam $d^2$, formed upon the surface of the cam-cylinder D, toward the rear portion thereof.

$g^2$ is a rock-shaft, located transversely of the machine and pivotally supported in bearings secured to the frame A and provided with two similar arms $g^3$ and $g^4$, secured to the respective extremities thereof.

$g^5$ is a link pivotally secured at the respective extremities thereof to the arm $g^3$ and to the link $g$.

$g^6$ is a horizontal rack located beneath the cloth plate or table $a$ and adapted to be reciprocated in suitable bearings secured thereto.

$g^7$ is a link pivotally secured at the respective ends thereof to the rack $g^6$ and to the arm $g^4$ and provided with a turn-buckle $g^8$ for adjusting and controlling the amplitude of the reciprocations of the rack $g^6$. When the cam-cylinder D is rotated the traveler $g'$, traversing the closed cam $d^2$, causes the link $g$ to oscillate backward and forward through a part of the arc of a circle. The closed cam $d^2$ is so proportioned as that the link $g$ pauses during a brief interval of time at the respective ends of its swing. The motion of this link $g$ is transmitted by means of the link $g^5$, rock-shaft $g^2$, and link $g^7$ to the rack $g^6$ and causes the latter to reciprocate alternately toward the right and left and also to pause at the end of each stroke.

The cloth plate or table $a$ is cut away in the rear of the needle, Figs. 1 and 4, for the reception of the hollow tube or cylinder $h$. This tube or cylinder $h$ is adapted to revolve in suitable bearings secured to the cloth plate or table $a$, and is provided at or near the center thereof with a spur-wheel $h'$, meshing with the rack $g^6$.

$h^2$, Fig. 9, are jaws extending toward the needle and provided with eyes $h^3$ for the reception of the cords $l$ and $l'$. When the rack $g^6$ is reciprocated backward and forward, as is above set forth, the tube $h$ and jaws $h^2$ revolve first toward the right and then pause, and finally revolve toward the left, and so in regular succession the above operation thereof is repeated.

Referring to the drawings, and especially to Figs. 2, 3, 5, 7, and 7ª thereof, $i$ and $i'$ are vertical posts having vertical slots $i^2$ and $i^3$ formed therein, and these posts are susceptible of being raised and lowered in bearings secured to the cloth plate or table $a$. These posts $i$ and $i'$ are held normally in a depressed position by means of springs $i^4$, either wound spirally around the posts, as shown in Fig. 3, or formed in the manner as shown in Fig. 5.

$i^5$ and $i^6$ are ribbon or tape guides secured to the posts $i$ and $i'$, respectively, and extending toward the needle.

$i^7$ is a lug depending downward from the ribbon-guide $i^5$ and extending through and beneath the cloth plate or table $a$ for guiding the edge of the work.

$i^8$ and $i^9$, Figs. 2, 5, and 7, are wedge-shaped cams, screwed or otherwise secured to the rack $g^6$ and engaging in the slots $i^2$ and $i^3$ of the posts $i$ and $i'$. These cams $i^8$ and $i^9$ are so proportioned that during the operation of the machine the posts $i$ and $i'$ are alternately raised and lowered and permitted to pause during a brief interval of time at the termination of each stroke.

In Fig. 7 the posts $i$ and $i'$, and the ribbon-guides $i^5$ and $i^6$, consisting of a series of tubes or channels, are preferably made in one piece.

The operation of the machine is as follows: The sewing-machine is driven in the usual or in any preferred manner, and the fabric is continuously fed into the machine, care being exercised to maintain the edge of the fabric in contact with the lug $i^7$, in order to insure the formation of the line of over-edge stitches $k$, as illustrated in Figs. 10 to 18, inclusive, along the edge of the fabric. While the stitch-forming mechanism forms a certain number of over-edge stitches $k$ along the edge of the fabric, the finger or bodkin $e^4$, carrying the cord $k'$, moving forward presents the cord $k'$ beneath one of the over-edge stitches $x'$. The finger or bodkin $e^4$, then traveling backward, raises the latch $f$ and carries the cord $k'$ beneath the same. During the formation of the next series of stitches the bodkin or finger $e^4$, moving forward, permits the latch $f$ to close, and leaving the cord $k'$, caught up by the hook of the latch $f$, Fig. 6, and again presents the cord $k'$ beneath another one of the over-edge stitches $x'$, thus completing the loop $k^3$. By the repetition of this process the raw or cut edge of the fabric is bound or confined with a continuous row of over-edge stitches $k$, and the cord $k'$ is simultaneously secured to the edge of the fabric by certain of these stitches, designated by the letter $x'$ in the accompanying drawings. It may be remarked that instead of securing the cord $k'$ by every fourth stitch $x'$, it may be secured by every second, third, or other preferred number of stitches. This result may be readily accomplished by removing the spur-wheels *e* and *e'* and replacing them with similar spur-wheels having a different ratio of diameters. Although the cord *k'* is represented in the drawings as secured to the upper surface of the fabric near the edge thereof, still the cord may be drawn from the surface of the fabric to the edge by increasing the tension exerted by the hook-shaped latch *f* upon the loop $k^3$. It is obvious that two superposed rows of loops $k^3$ and $k^4$, Figs. 8 and 14 to 18, inclusive, instead of one row of loops, may be readily formed by employing two bodkins or fingers and two latches, as illustrated in Fig. 8, and permitting the same to operate alternately. While the raw or cut edge of the fabric is being confined by the over-edge stitches and while the loops $k^3$ are being formed the ascending and descending guides $i^5$ and $i^6$, Figs. 7ª, braid or lay the cords, tapes, or ribbons $k^6$ alternately under and over the pillars or bars $k^5$ of the loops $k^3$. Of course the number of cords, ribbons, or tapes employed may be increased or diminished, as may be preferred or required.

During the formation of the loops $k^3$ the cylinders or tubes *h* are revolved intermittently in alternate directions, and the jaws $h^2$, Fig. 9, thereof twist the cords *l* and *l'* around the bars or pillar $k^5$ and across the loops $k^3$ alternately in opposite directions.

It will be obvious to those skilled in the art to which my invention appertains that parts thereof may be employed separately. For example, the loop-forming mechanism illustrated in Fig. 6 may be used alone or in connection with the twisting mechanism illustrated in Fig. 9, or with the braid or ribbon laying mechanism illustrated in Figs. 7 and 7ª, or with both. It will be also evident that modifications may be made in the details and construction of the parts to adapt them to the different types of sewing-machines without necessarily departing from the spirit of my invention.

Having thus described the nature and objects of my invention, what I claim as new, and desire to secure by Letters Patent, is—

1. The combination, in a sewing-machine, of a needle and stitch-forming mechanism, a spring-latch, a loop-forming finger adapted to reciprocate in front of the needle and to contact with said spring-latch, a cord-twister located in front of the needle and adapted to rotate alternately in opposite directions, a ribbon-guide rising and descending in front of the needle, and means for actuating said cord-twister, ribbon-guide, loop-finger, and spring-latch, substantially as and for the purposes set forth.

2. The combination, in a sewing-machine, of a needle and stitch-forming mechanism, a spring-latch, a loop-forming finger, a cord-twister in front of the needle, and means to actuate said cord-twister and loop-forming finger, substantially as and for the purposes set forth.

3. The combination, in a sewing-machine, of a needle, stitch and loop forming mechanism, a cord-twister located in front of the needle, and means to actuate said cord-twister, substantially as and for the purposes set forth.

4. The combination, in a sewing-machine, of a needle and stitch-forming mechanism, a finger or bodkin, a spring-latch, and means to reciprocate said finger or bodkin alternately past the needle in a straight course and to cause the same to contact with said spring-latch, substantially as and for the purposes set forth.

5. The combination, in a sewing-machine, of a needle and stitch-forming mechanism, a finger provided with an eye, a spring-latch provided with a hook adapted to contact with the cloth-plate, a lug located on said finger, and means to intermittently reciprocate said finger in a forward direction beneath and in advance of said needle and rearward to contact with said spring-latch, substantially as and for the purposes set forth.

6. The combination, in a sewing-machine provided with a needle and stitch-forming mechanism, of a spring-latch, a cam located above the cloth-plate, a carriage adapted to be reciprocated intermittently in a straight course and having a roller engaging with said cam, a finger secured to said carriage and adapted to advance in front of said needle and to contact with and actuate said latch, and means to revolve said cam, substantially as and for the purposes set forth.

7. The combination, in a sewing-machine, of a needle, stitch and loop forming mechanism, a cam, a cam-bar supported in bearings attached to the under side of the cloth-plate, a normally-depressed tape-guide located in front of the needle and engaging with said cam-bar, and means engaging with said cam for reciprocating said cam-bar, substantially as and for the purposes set forth.

8. The combination, in a sewing-machine provided with a needle and stitch and loop forming mechanisms, of a rock-shaft provided with an arm, a rack, spindles provided with jaws having eyes formed therein, and said spindles supported in suitable bearings, a pinion attached to said spindles and meshing with said rack, a link connected with said rack, and the arm of said shaft having a turnbuckle, substantially as and for the purposes set forth.

9. The combination, in a sewing-machine provided with a needle and stitch and loop forming mechanisms, of a rock-shaft having an arm, a rack, hollow spindles provided with jaws having eyes formed therein, and said spindles supported in suitable bearings adjacent to the needle, pinions upon the hollow spindles meshing with said rack, and a link connected with said rack and arm, substantially as and for the purposes set forth.

10. The combination, in a sewing-machine, of a needle and mechanism for forming loops and stitching the same to a fabric, tape-guides located in front of the needle, lugs for directing the fabric secured to said guides and depending through recesses formed in the cloth-plate, and means for actuating said guides, substantially as and for the purposes set forth.

11. In a sewing-machine provided with mechanism for forming loops and stitching the same to a fabric, the combination of a rack adapted to slide in bearings located beneath the cloth-plate, cams secured to said rack, cord-twisters provided with pinions meshing therewith, tape or ribbon guides engaging with said cams, and means for reciprocating said rack, substantially as and for the purposes set forth.

12. The combination, in a sewing-machine, of a needle and stitch-forming mechanism, hollow spindles provided with jaws and supported in horizontal bearings, spur-wheels attached to said spindles, a rack adapted to engage with said spur-wheel, bodkins or fingers attached to a carriage, and means to intermittently reciprocate said rack and carriage, substantially as and for the purposes set forth.

13. The combination, in a sewing-machine, of a needle and a stitch-forming mechanism adapted to form a row of stitches along the edge of a fabric, a loop-forming mechanism adapted to form depending looped bars or pillars which are confined by certain of said stitches to the edge of the fabric, a twisting mechanism adapted to lay together two or more cords or tapes alternately in opposite directions around said bars or pillars and across said loops, and means for actuating the several recited parts of the machine, substantially as and for the purposes set forth.

14. The combination, in a sewing-machine, of a needle and stitch-forming mechanism, two fingers or bodkins located the one above the other, two spring-latches, and means for alternately reciprocating said fingers in straight lines in advance of the needle and into contact with and for the actuation of said latches, substantially as and for the purposes set forth.

15. The combination, in a sewing-machine, of a needle and stitch and loop forming mechanism, a slotted tape-guide located in front of the needle, springs adapted to normally depress said guide, a cam engaging in the slot of said guide and said cam adapted to elevate said guide, and means for reciprocating said cam, substantially as and for the purposes set forth.

16. The combination, in a sewing-machine, of a needle and stitch and loop forming mechanisms, slotted tape or ribbon guides located in front of the needle, springs adapted to normally depress said guides, cams adapted to engage in said slotted guides, means to reciprocate said cams, and a cord-twister and mechanism adapted to lay together two or more cords in opposite directions around the loops of the fabric, substantially as and for the purposes set forth.

In witness whereof I have hereunto set my signature in the presence of two subscribing witnesses.

DAVID C. BELLIS.

Witnesses:
GEO. W. REED,
THOMAS M. SMITH.